(12) United States Patent
Rana et al.

(10) Patent No.: US 10,909,489 B2
(45) Date of Patent: Feb. 2, 2021

(54) METHOD AND SYSTEM FOR PLANNING A STRATEGY PERTAINING TO A BUSINESS OPPORTUNITY IN COGNITIVE DECISION-MAKING PROCESS

(71) Applicant: Diwo, LLC, Northville, MI (US)

(72) Inventors: Satyendra Pal Rana, Northville, MI (US); Chandra Puttanna Keerthy, Northville, MI (US); Krishna Prakash Kallakuri, Northville, MI (US)

(73) Assignee: DIWO, LLC, Northville, MI (US)

( * ) Notice: Subject to any disclaimer, the term of this patent is extended or adjusted under 35 U.S.C. 154(b) by 589 days.

(21) Appl. No.: 15/788,349

(22) Filed: Oct. 19, 2017

(65) Prior Publication Data
US 2018/0114162 A1 Apr. 26, 2018

Related U.S. Application Data

(60) Provisional application No. 62/410,729, filed on Oct. 20, 2016.

(51) Int. Cl.
*G06Q 10/00* (2012.01)
*G06Q 10/06* (2012.01)
(Continued)

(52) U.S. Cl.
CPC ......... *G06Q 10/0637* (2013.01); *G06F 40/40* (2020.01); *G06F 40/56* (2020.01); *G06N 5/022* (2013.01); *G06N 5/04* (2013.01)

(58) Field of Classification Search
None
See application file for complete search history.

(56) References Cited

U.S. PATENT DOCUMENTS 5,978,778 A * 11/1999 O'Shaughnessy ..... G06Q 40/00
705/35
7,305,351 B1 * 12/2007 Bechhofer ......... G06Q 10/0635
705/7.28
(Continued)

OTHER PUBLICATIONS

Matthäus Urwyler, Aarwangen (Bern), "Opportunity Identification and Exploitation: A Case Study of Three Swiss-Based Software Companies", 2006.
(Continued)

*Primary Examiner* — Gurkanwaljit Singh
(74) *Attorney, Agent, or Firm* — FisherBroyles, LLP; Susan M. Oiler

(57) ABSTRACT

Disclosed is a strategy planning system for displaying a narrative content associated to an optimal strategy to be implemented for a business opportunity. The strategy planning system comprises a strategy computation module, a strategy synthesis module, and a strategy customization module. The strategy computation module determines an optimal strategy, amongst a set of strategies, to be implemented for a business opportunity. The strategy synthesis module generates a narrative content for the optimal strategy by selecting a predefined narrative template, comprising a predefined content, associated to the optimal strategy. Post selection of the predefined narrative template, a narrative description for the optimal strategy may be created by performing a Natural Language Generation (NLG) technique on metadata associated to the impact analysis. Subsequently, the narrative description may be appended to the predefined content in order to generate the narrative content for the optimal strategy. After generating the narrative content, the strategy synthesis module displays the narrative content, associated to the optimal strategy to be implemented for a business opportunity, to a user.

18 Claims, 7 Drawing Sheets

(51) Int. Cl.
*G06N 5/02* (2006.01)
*G06F 40/40* (2020.01)
*G06F 40/56* (2020.01)
*G06N 5/04* (2006.01)

(56) References Cited

U.S. PATENT DOCUMENTS

| | | | |
|---|---|---|---|
| 7,346,529 B2 | 3/2008 | Flores | |
| 7,904,320 B1 | 3/2011 | Adams et al. | |
| 8,204,809 B1* | 6/2012 | Wise | G06Q 40/06 705/35 |
| 8,214,238 B1* | 7/2012 | Fairfield | G06Q 10/063 705/7.11 |
| 8,311,863 B1* | 11/2012 | Kemp | G06Q 10/0639 705/7.11 |
| 8,781,882 B1* | 7/2014 | Arboletti | G06Q 10/0639 705/7.39 |
| 9,996,626 B1* | 6/2018 | Bailey | G06F 7/00 |
| 2003/0130884 A1* | 7/2003 | Michaluk | G06Q 10/0637 705/7.36 |
| 2005/0209942 A1* | 9/2005 | Ballow | G06Q 40/00 705/35 |
| 2006/0080159 A1 | 4/2006 | Kumar | |
| 2006/0103822 A1* | 5/2006 | Werkman | G03F 7/70633 355/55 |
| 2007/0094060 A1* | 4/2007 | Apps | G06F 16/2428 705/7.36 |
| 2008/0015871 A1* | 1/2008 | Eder | G06Q 10/067 706/21 |
| 2009/0018891 A1* | 1/2009 | Eder | G06Q 10/06 705/7.28 |
| 2009/0093300 A1* | 4/2009 | Lutnick | G07F 17/32 463/26 |
| 2013/0339099 A1* | 12/2013 | Aidroos | G06Q 50/01 705/7.36 |
| 2014/0058794 A1* | 2/2014 | Malov | G06Q 10/083 705/7.31 |
| 2014/0310042 A1* | 10/2014 | Bernier | G06Q 10/0631 705/7.16 |
| 2015/0112906 A1* | 4/2015 | Gauthier | G06N 7/00 706/13 |

OTHER PUBLICATIONS

IBM, "The Era of Cognitive Systems: An Inside Look at IBM Watson and How it Works", Dec. 2012.

* cited by examiner

METHOD AND SYSTEM FOR PLANNING A STRATEGY PERTAINING TO A BUSINESS OPPORTUNITY IN COGNITIVE DECISION-MAKING PROCESS

CROSS REFERENCE TO RELATED APPLICATIONS

This patent application claims priority from U.S. Provisional Application No. 62/410,729 filed on Oct. 20, 2016, the entirety of which is hereby incorporated by reference.

TECHNICAL FIELD

The present disclosure described herein, in general, relates to planning a strategy pertaining to a business opportunity in a cognitive decision-making framework.

BACKGROUND

Continuous business improvement initiatives in the past were predominantly driven by the notion of quality. Methods and systems were put in place to track defects in processes, and to generate KPI's (key performance indicators) based on quality driven metrics and measurements. It was well accepted across business sectors that the quality is a huge differentiator, and higher quality leads to higher value. These notions were subsequently challenged by the need for business agility and the resulting imperative to function effectively in spite of imperfect information and/or processes.

Most methods and systems of the prior art do not lend themselves well to the context of modern businesses where big data is the norm and the causal impact of a real-time fluctuation, in a business environment, may be immediate and significant. Businesses are struggling on multiple fronts to get on the bandwagon of this big data led frontier of business performance optimization. Notwithstanding the huge skills gap and immaturity of big data engineering technologies, the fundamental issue is the lack of a coherent framework for business performance optimization that incorporates big data and advanced analytics at its core. In addition, the immaturity of the big data engineering technologies, many companies are unable to systematically and consistently identify, develop, and create substantial new growth opportunities from the big data for the business interest. This may lead to a huge loss of business opportunity and other activities that generally build business slowly.

SUMMARY

Before the present systems and methods, are described, it is to be understood that this application is not limited to the particular systems, and methodologies described, as there can be multiple possible embodiments which are not expressly illustrated in the present disclosure. It is also to be understood that the terminology used in the description is for the purpose of describing the particular versions or embodiments only, and is not intended to limit the scope of the present application. This summary is provided to introduce concepts related to systems and methods for planning a strategy pertaining to a business opportunity and the concepts are further described below in the detailed description. This summary is not intended to identify essential features of the claimed subject matter nor is it intended for use in determining or limiting the scope of the claimed subject matter.

In one implementation, a strategy planning system for displaying a narrative content associated to an optimal strategy to be implemented for a business opportunity is disclosed. The strategy planning system may comprise a processor and a memory coupled to the processor. The processor may execute a plurality of modules present in the memory. The plurality of modules may comprise a strategy computation module and a strategy synthesis module. The computation module may determine an optimal strategy, amongst a set of strategies, to be implemented for a business opportunity. In one aspect, the optimal strategy may be determined upon performing an impact analysis for the optimal strategy. The strategy synthesis module may generate a narrative content for the optimal strategy by selecting a predefined narrative template, comprising a predefined content, associated to the optimal strategy. In one aspect, the predefined narrative template may be selected based on a type of the optimal strategy. Upon selection of the predefined narrative template, a narrative description for the optimal strategy may be created by performing a Natural Language Generation (NLG) technique on metadata associated to the impact analysis. Subsequently, the strategy synthesis module may append the narrative description to the predefined content in order to generate the narrative content for the optimal strategy. The strategy synthesis module may further display the narrative content associated to the optimal strategy to be implemented for a business opportunity.

In another implementation, a method for displaying a narrative content associated to an optimal strategy to be implemented for a business opportunity is disclosed. In order to display the narrative content, initially, an optimal strategy, amongst a set of strategies, to be implemented may be determined for a business opportunity. In one aspect, the optimal strategy may be determined upon performing an impact analysis for the optimal strategy. Subsequent to the determination of the optimal strategy, a narrative content may be generated for the optimal strategy by selecting a predefined narrative template, comprising a predefined content, associated to the optimal strategy. In one aspect, the predefined narrative template may be selected based on a type of the optimal strategy. Post selection of the predefined narrative template, a narrative description for the optimal strategy may be created by performing a Natural Language Generation (NLG) technique on metadata associated to the impact analysis. Subsequently, the narrative description may be appended to the predefined content in order to generate the narrative content for the optimal strategy. After generating the narrative content, the narrative content, associated to the optimal strategy to be implemented for a business opportunity, may be displayed. In one aspect, the aforementioned method for displaying the narrative content may be performed by a processor using programmed instructions stored in a memory of the strategy planning system.

In yet another implementation, non-transitory computer readable medium embodying a program executable in a computing device for displaying a narrative content associated to an optimal strategy to be implemented for a business opportunity is disclosed. The program may comprise a program code for determining an optimal strategy, amongst a set of strategies, to be implemented for a business opportunity, wherein the optimal strategy is determined upon performing an impact analysis for the optimal strategy. The program may further comprise a program code for generating a narrative content for the optimal strategy by selecting a predefined narrative template, comprising a predefined content, for the optimal strategy, wherein the predefined narrative template is selected based on a type of the optimal strategy, creating a narrative description for the optimal strategy by performing a Natural Language Generation (NLG) technique on metadata associated to the impact analysis, and appending the narrative description to the predefined content in order to generate the narrative content for the optimal strategy. The program may further comprise a program code for displaying the narrative content associated to the optimal strategy to be implemented for the business opportunity.

BRIEF DESCRIPTION OF THE DRAWINGS

The foregoing detailed description of embodiments is better understood when read in conjunction with the appended drawing. For the purpose of illustrating the disclosure, there is shown in the present document example constructions of the disclosure; however, the disclosure is not limited to the specific methods and apparatus disclosed in the document and the drawings.

The detailed description is described with reference to the accompanying figure. In the figure, the left-most digit(s) of a reference number identifies the figure in which the reference number first appears. The same numbers are used throughout the drawings to refer like features and components.

Figure 1:
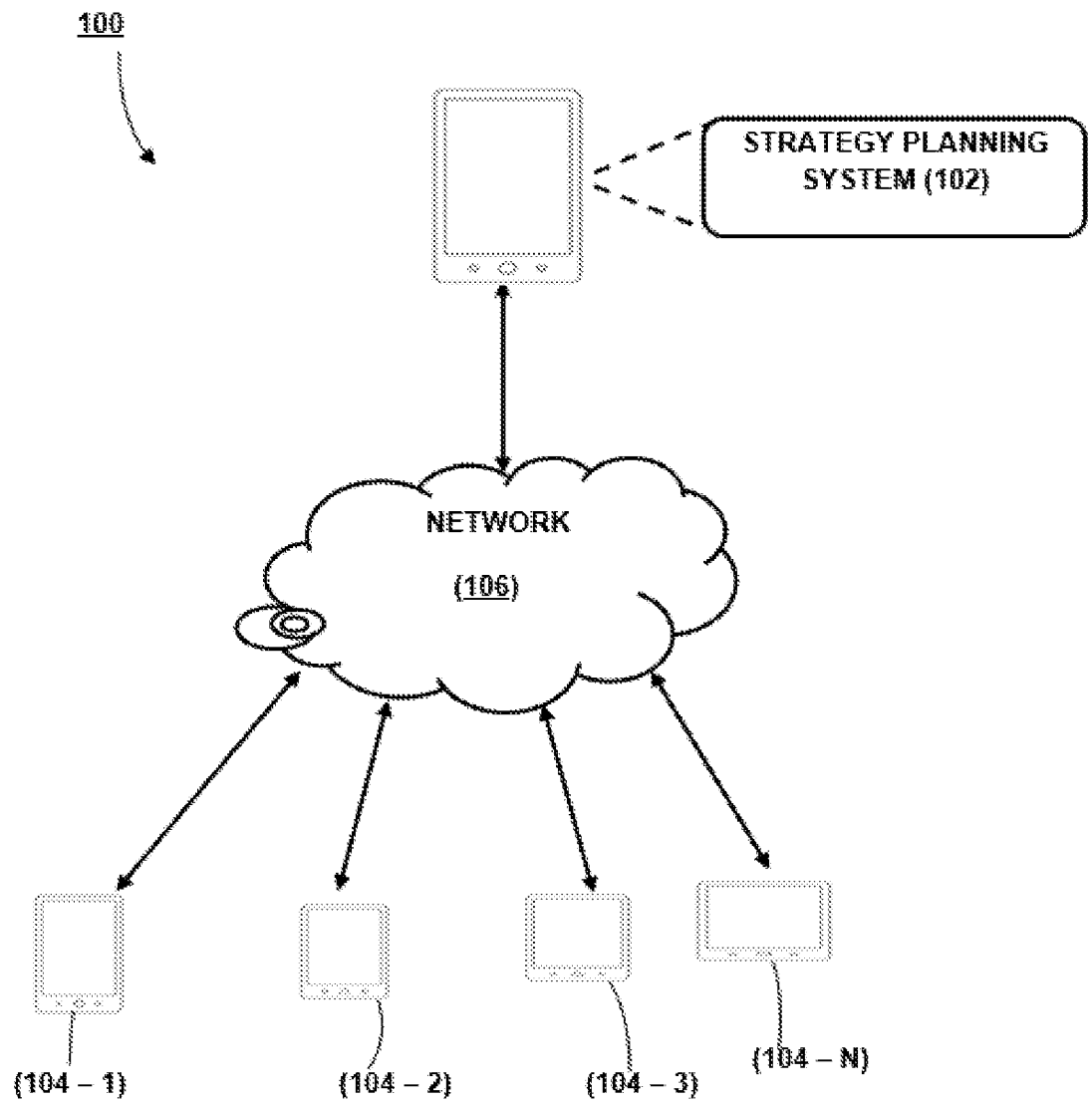
FIG. 1 illustrates a network implementation of a strategy planning system for planning a strategy pertaining to a business opportunity is shown, in accordance with an embodiment of the present disclosure.

The figure depicts an embodiment of the present disclosure for purposes of illustration only. One skilled in the art will readily recognize from the following discussion that alternative embodiments of the structures and methods illustrated herein may be employed without departing from the principles of the disclosure described herein.

DETAILED DESCRIPTION

Some embodiments of this disclosure, illustrating all its features, will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items. It must also be noted that, the singular forms "a," "an," and "the" include plural references unless the context clearly dictates otherwise. Although any apparatuses and methods similar or equivalent to those described herein can be used in the practice or testing of embodiments of the present disclosure, the exemplary, apparatuses and methods are now described. The disclosed embodiments are merely exemplary of the disclosure, which may be embodied in various forms.

Various modifications to the embodiment will be readily apparent to those skilled in the art and the generic principles herein may be applied to other embodiments. However, one of ordinary skill in the art will readily recognize that the present disclosure is not intended to be limited to the embodiments illustrated, but is to be accorded the widest scope consistent with the principles and features described herein.

It must be understood that a strategy is a plan of action designed to achieve a designated goal. A business opportunity, on the other hand, is a set of circumstances that comes along the way of a business operation and which needs to be handled strategically in order to promote the business. Though a lot of business opportunities may come, however handling each opportunity with an optimal strategy is the key to success. It may be noted that the strategy planning system may determine the optimal strategy, amongst a plurality of strategies, to be implemented for the business opportunity. However, the optimal strategy needs to be implemented on time by a decision maker so as to achieve the designated goal. Therefore, it becomes further important to provide a rationale for the recommendation of the optimal strategy to a user.

To do so, the present strategy planning system and method facilitates to display a narrative content associated to an optimal strategy to be implemented for a business opportunity is disclosed. It may be understood that the strategy planning system addresses the business opportunity in an optimal manner In order to formalize the strategy planning for the business opportunity, the strategy planning system first determines a feasible set of strategies types and then determines the optimal strategy, amongst the feasible set of strategies, or combination of feasible strategies.

In one aspect, the strategy planning system may comprise a strategy computation module, a strategy synthesis module, and a strategy customization module. The strategy computation module is a fully automated module for a given opportunity instance that may determine the optimal strategy for each new business opportunity.

The strategy synthesis module, on the other hand, is a decision maker that synthesizes pertinent information about the strategy recommended by the strategy computation module and displays a narrative content associated to the optimal strategy determined by the strategy computation module. In one aspect, the narrative content may be displayed based on a predefined narrative template, comprising a predefined content, associated to the optimal strategy and a narrative description generated by performing a Natural Language Generation (NLG) technique.

The strategy customization module may be responsible for interactions with a decision-maker via a human interaction module for the purpose of what-if-analysis on the strategy recommended by the strategy computation module. The decision maker using an interactive visual tool presented by the human interaction module may be provided by the means to vary the values of few selected decision variables pertaining to the optimal strategy. As the values of these decision variables are changed, the optimal strategy may be recomputed as well as the strategy synthesis is modified accordingly. This process may repeat several times until it results into a number of different strategies. The decision maker compares these alternate strategies and eventually approves the final strategy to be implemented.

Referring now to FIG. 1, a network implementation 100 of a strategy planning system 102 for displaying a narrative content associated to an optimal strategy to be implemented for a business opportunity is disclosed. In order to display the narrative content, initially, the strategy planning system 102 determines an optimal strategy, amongst a set of strategies, to be implemented for the business opportunity. Subsequent to the determination of the optimal strategy, the strategy planning system 102 generates a narrative content may be generated for the optimal strategy. After generating the narrative content, the strategy planning system 102 displays the narrative content associated to the optimal strategy to be implemented for the business opportunity.

Although the present disclosure is explained considering that the strategy planning system 102 is implemented on a single server, it may be understood that the strategy planning system 102 may also be implemented in a Distributed Computing Environment (DCE), involving variety of computing systems operating in parallel. Examples of the computing systems may include, but not limited to, a laptop computer, a desktop computer, a notebook, a workstation, a mainframe computer, a server, a network server, and the like. It will be understood that the strategy planning system 102 may be accessed by multiple users through one or more user devices 104-1, 104-2, 104-3; 104-N. In one implementation, the strategy planning system 102 may comprise the cloud-based computing environment in which a user may operate individual computing systems configured to execute remotely located applications. Examples of the user devices 104 may include, but are not limited to, a portable computer, a personal digital assistant, a handheld device, and a workstation. The user devices 104 are communicatively coupled to the strategy planning system 102 through a network 106.

In one implementation, the network 106 may be a wireless network, a wired network or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

Figure 2:
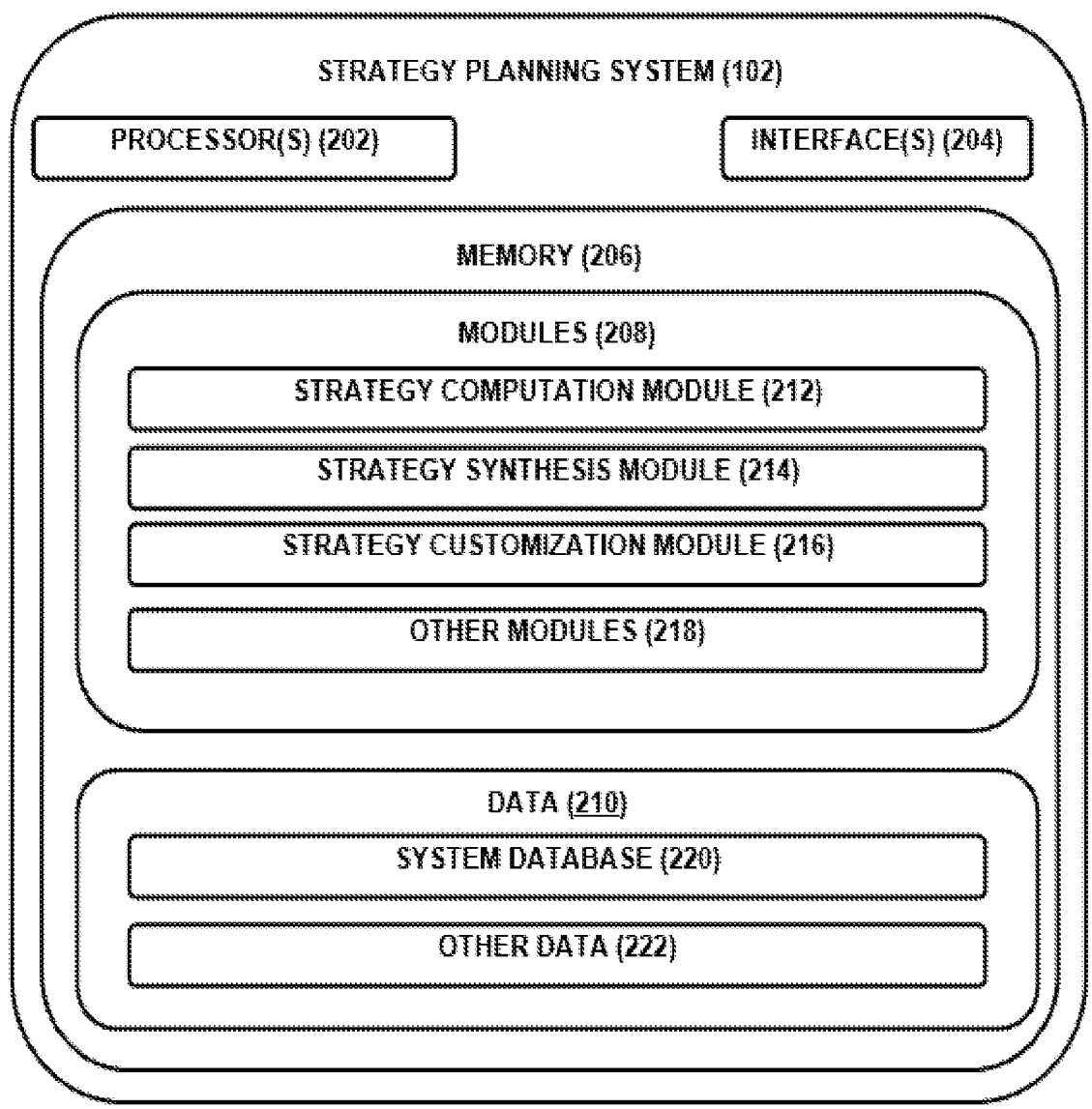
FIG. 2 illustrates the strategy planning system, in accordance with an embodiment of the present disclosure.

Referring now to FIG. 2, the strategy planning system 102 is illustrated in accordance with an embodiment of the present subject matter. In one embodiment, the strategy planning system 102 may include at least one processor 202, an input/output (I/O) interface 204, and a memory 206. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, the at least one processor 202 is configured to fetch and execute computer-readable instructions stored in the memory 206.

The I/O interface 204 may include a variety of software and hardware interfaces, for example, a web interface, a graphical user interface, and the like. The I/O interface 204 may allow the strategy planning system 102 to interact with the user directly or through the client devices 104. Further, the I/O interface 204 may enable the strategy planning system 102 to communicate with other computing devices, such as web servers and external data servers (not shown). The I/O interface 204 can facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206 may include any computer-readable medium or computer program product known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 206 may include modules 208 and data 210.

The modules 208 include routines, programs, objects, components, data structures, etc., which perform particular tasks or implement particular abstract data types. In one implementation, the modules 208 may include a strategy computation module 212, a strategy synthesis module 214, a strategy customization module 216, and other modules 218. The other modules 218 may include programs or coded instructions that supplement applications and functions of the strategy planning system 102. The modules 208 described herein may be implemented as software modules that may be executed in the cloud-based computing environment of the strategy planning system 102.

The data 210, amongst other things, serves as a repository for storing data processed, received, and generated by one or more of the modules 208. The data 210 may include data generated as a result of the execution of one or more modules in the other modules 218. Further, the data 210 may include a system database 220 and other data 222. In one aspect, the system database 220 may comprise sensory input knowledge object, opportunity type knowledge object, opportunity detection knowledge object, and opportunity instance knowledge object. The other data 222 may include data generated as a result of the execution of one or more modules in the other modules 218. The detailed description of the modules 210 along with other components of the strategy planning system 102 is further explained by referring to FIG. 2.

In one implementation, the strategy planning system 102 addresses the challenges observed in the existing art. More specifically, the strategy planning system 102 facilitates capturing of the business opportunity (hereinafter also referred to as opportunity) in an optimal manner In order to formalize the strategy planning, a concept of a strategy is being introduced. The strategy represents a class of strategies which require similar actions for implementation. For example, consider an 'Excess Stock Prevention Opportunity' in the retail sector. This opportunity indicates that a situation where the strategy planning system 102 predicts with high confidence that an excess stock scenario might occur in the near future. In one aspect, the excess stock has a cost associated with it and thus, preventing it will cause a net saving. There are various ways of dealing with the excess stock such as: Reduce Price (Price Reduction), Give, Discount, Cross-sell with another product (Product Bundling), Transfer to another store (Inter-store Transfer).

In one aspect, there are three different strategies for handling the 'Excess Stock Prevention Opportunity'. For example, 'Price Reduction' is a strategy type and 'reduce price by 5% for next 5 days' is one particular strategy of 'Price Reduction' strategy type. Strategy Type levers for 'Price Reduction' are: 'Percentage Discount' and 'Discounting Schedule'. By varying 'percentage discount' and 'discounting schedule', many different strategies of 'Price Reduction' strategy type may be determined.

Likewise, 'Inter-Store Transfer' is a strategy type and 'Transfer 100 units to Store #68 on Tuesday' is a particular instance of 'Inter-Store Transfer' strategy. The strategy levers are 'Units to Transfer', 'Stores to transfer to' and 'date of transfer'.

It may be understood that there is a cost associated with the implementation of strategies. The costs should be less than the losses incurred by the excessive stock otherwise a particular strategy may not be useful. Furthermore, there is a lead-time involved in implementing a strategy. If one does not have enough time to implement a strategy of a particular strategy type, there is no point in considering that particular strategy type. For the above and other reasons, given an opportunity instance, not all applicable strategies may be feasible.

Thus, in order to determine an optimal strategy applicable for a business opportunity, the strategy computation module 212 determines an optimal strategy, amongst a set of strategies, to be implemented for the business opportunity. In one embodiment, the optimal strategy may be determined upon performing an impact analysis for the optimal strategy. In another embodiment, the optimal strategy may be determined based on a set of Key Performance Indicators (KPIs) associated to the business opportunity. The set of KPIs may comprise business policy, brand and profit. It may be noted that the optimal strategy may be a combination of multiple strategies to be implemented for the business opportunity. In one aspect, the impact analysis may be performed to predict an impact, indicating a profit to be attained, when the optimal strategy is implemented for the business opportunity.

Upon determining the optimal strategy, the strategy synthesis module 214 generates a narrative content for the optimal strategy. In one aspect, the strategy synthesis module 214 is a decision maker, which synthesizes pertinent information about the strategy recommended by the strategy computation module 212 and further provides interactive tools to varying strategy type levers in order to compare variations of the automatically recommended strategy. In other words, the strategy synthesis module 214 rationalizes the determination or recommendation of the optimal strategy, by the strategy computation module 212, by generating the narrative content for the optimal strategy. It may be understood that the narrative content will certainly help the user to take the decision for implementing the optimal strategy as it will provide the facts to the user that what will be the impact on the business, when the optimal strategy is implemented for the business opportunity.

Figure 4:
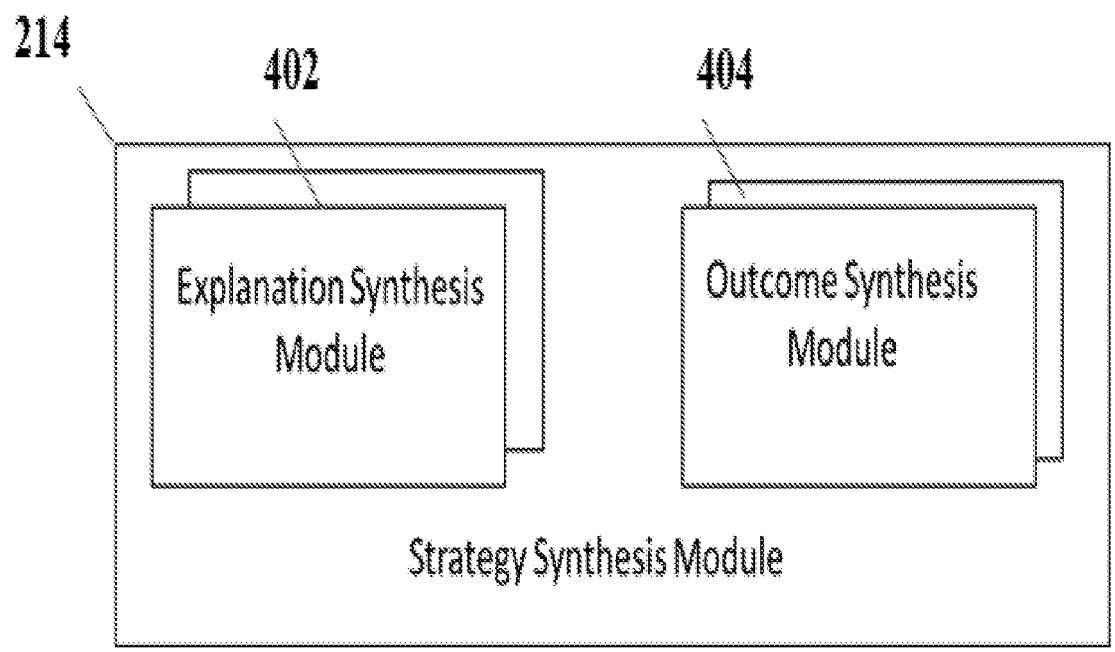
FIG. 4 illustrates the strategy synthesis module, in accordance with an embodiment of the present disclosure.

To generate the narrative content, the strategy synthesis module 214 further comprises an explanation synthesis module 402 and an outcome synthesis module 404, as shown in FIG. 4. The explanation synthesis module 402, at first, selects a predefined narrative template associated to the optimal strategy. The predefined narrative template comprises a predefined content. In one aspect, the predefined narrative template may be selected based on a type of the optimal strategy. Examples of the type of the optimal strategy may include, but not limited to, Give Discount on SKU, Mark Down on Maximum Retail Price (MRP), Product Bundling, Inter-store Transfer, Loyalty Points, Price Reduction.

Subsequent to the selection of the predefined narrative template, the explanation synthesis module 402 creates a narrative description for the optimal strategy. In one embodiment, the narrative description may be created by performing a Natural Language Generation (NLG) technique on metadata associated to the impact analysis. In one embodiment, the NLG technique may generate the narrative description, in natural language, by performing one or more steps including 'Content determination', 'Document structuring', 'Aggregation', 'Choice of words', and 'Realization'.

Content determination may help in deciding what information needs to be mentioned in the narrative description.

Document structuring: Overall organization of the information to be conveyed.

Aggregation: Merging of similar sentences to improve readability and naturalness.

Choice of words: Choosing appropriate words in accordance with the concept.

Realization: Creating the actual text, that should be formed according to the rules of syntax, morphology, and orthography.

After creating the narrative description, the explanation synthesis module 402 appends the narrative description to the predefined content in order to generate the narrative content for the optimal strategy. After generation of the narrative content, the strategy synthesis module 214 displays the narrative content for the optimal strategy recommended pertaining to the business opportunity.

In one embodiment, the strategy synthesis module 214 further includes a visual description of the optimal strategy in the narrative content. The visual description may include, an image with a description or a video or a graphical chart such as a bar chart or a pie chart. In one aspect, the visual description may be identified from a system database 220 based on the metadata. Thus, in this manner, the strategy synthesis module 214 displays the narrative content associated to the optimal strategy to be implemented for the business opportunity.

To elucidate further, consider an example where a strategy 'Give Discount' is determined as the optimal strategy, by the strategy computation module 212, for the 'Excess Stock Prevention Opportunity', as aforementioned. The aim for implementing the 'Give Discount' strategy is to clear the excess stocks present in a warehouse before a predefined time period. Upon determination, the explanation synthesis module 402 selects a predefined template i.e. 'The optimal strategy for the Excess Stock Prevention Opportunity is Give Discount'. Thereafter the strategy synthesis module 214 further creates a narrative description for 'Give Discount' (determined as the optimal strategy) by performing the NLG technique on metadata associated to the impact analysis. Here the metadata indicates that what will the impact, in terms of profit, of the strategy on the business when the 'Give Discount' is implemented, wherein the impact is determined upon performing computation analysis based on the metadata. In other words, the metadata indicates the 'profit' when a specific percentage of discount is being given on each Stock Keeping Unit (SKU) present in the warehouse.

Based on the metadata, the explanation synthesis module 402 dynamically generates the narrative description i.e., 'This is because the implementation of the strategy will result in approximate profit of $50,000, when 10% discount is provided on SKUs whose Maximum Retail Price (MRP) ranging between $100 to 1000 and 20% discount is provided on SKUs whose MRP ranging beyond $1000'. On successful implementation of the strategy, the stock needs to replenished by [date] [month] [year]'.

It may be noted that the aforementioned narrative description is generated by performing the NLG technique on the metadata associated to the impact analysis. Subsequently, the explanation synthesis module 402 appends the narrative description to the predefined content and thereby displays the narrative content, as mentioned below, to the user.

'The optimal strategy for the Excess Stock Prevention Opportunity is Give Discount. This is because the implementation of the strategy will result in approximate profit of $50,000, when 10% discount is provided on SKUs whose Maximum Retail Price (MRP) ranging between $100 to $1000 and 20% discount is provided on SKUs whose MRP ranging beyond $1000'. On successful implementation of the strategy, the stock needs to replenished by [date] [month] [year].' It may be noted that the above mentioned narrative content is presented here for illustration purposes and may be different from the actual implementation.

In addition to the explanation synthesis module 402, the strategy synthesis module 214 further comprises the outcome synthesis module 404. In one aspect, the outcome synthesis module 404 generates an outcome metrics indicating a profit attained when the optimal strategy is implemented. In one aspect, the optimal strategy is established to optimize a goal that may or may not be in monetary terms. For example, the optimal strategy may be optimized to reduce excess stock. The outcome metrics is a quantification of the impact of stock reduction in financial terms. This impact calculation may be quite simple or very complex, depending on the scope of the optimization goal and the time available to act upon the recommended strategy.

Figure 3:
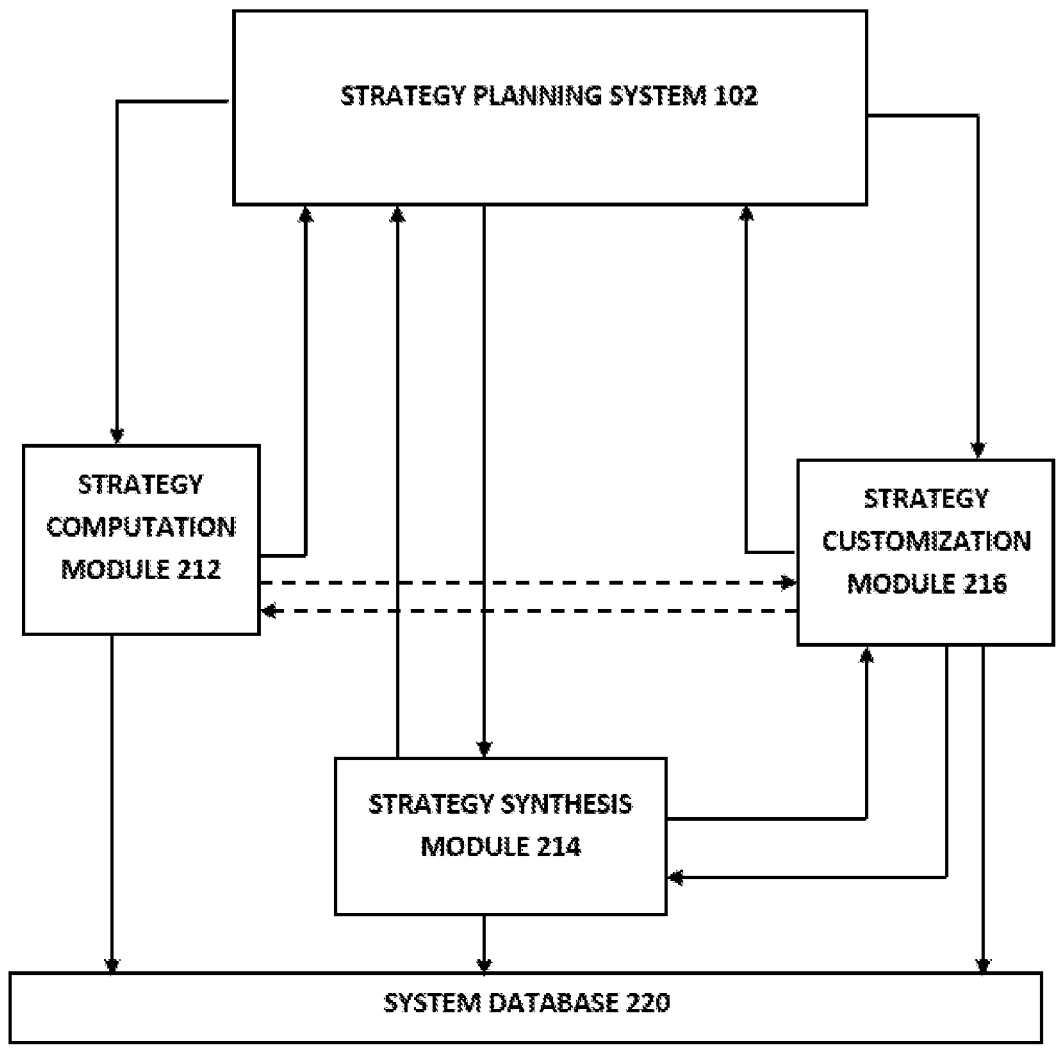
FIG. 3 illustrates the top level flow of messages in the strategy planning system, in accordance with an embodiment of the present disclosure.

Referring to FIG. 3 shows the top level flow of messages in the strategy planning system 102, using the message types listed in table 1. In one embodiment, the below table 1 shows message types used by the strategy planning system 102 for displaying the narrative content associated to the optimal strategy to be implemented for the business opportunity. The detailed description of the flow of messages is described below.

Message Types used by the strategy planning system 102

| Message Type | Producer Module | Consumer Module | Description |
| --- | --- | --- | --- |
| Strategy-Start | Opportunity Sensing System (not shown) | Strategy Planning System 102 | This message triggers strategy planning for a newly created opportunity instance. |
| S-C-Start (Strategy Computation Start) | Strategy Planning System 102 | Strategy Computation Module 212 | This message triggers analysis to derive an optimal strategy for addressing the new opportunity. |
| S-C-Done (Strategy Computation Done) | Strategy Computation Module 212 | Strategy Planning System 102 | This message is emitted after completion of formulating optimal strategy. |
| S-S-Start (Strategy Synthesis Start) | Strategy Planning System 102 | Strategy Synthesis Module 214 | This message triggers synthesis of contextual information (explanation and outcome) for the newly formulated strategy. |
| S-S-Done (Strategy Synthesis Done) | Strategy Synthesis Module 214 | Strategy Planning System 102 | This message is emitted after completion of strategy synthesis. |
| Action-Start | Strategy Planning System 102 | Action Guidance System (not shown) | This message is emitted after receiving S-S-Done message for the newly created opportunity instance. |
| Customization-Start (Customization Start) | Human-Interaction System (not shown) | Strategy Planning System 102 | This message is generated to customize a recommended strategy by pre-selecting few strategy levers |
| Customization-Done (Customization Done) | Strategy Planning System 102 | Human-Interaction System (not shown) | This message is emitted after completion of strategy customization. |
| Strategy-Approved | Human Interaction System (not shown) | Strategy Planning System 102 | This message indicated that a strategy has been approved by the decision-maker. |
| S-CU-Start | Strategy Planning System 102 | Strategy Customization Module 216 | This message is to start re-computing of optimal strategy |
| S-CU-Done | Strategy Customization Module 216 | Strategy Planning System 102 | This message is emitted after complete of re-computation of strategy. |
| S-C-Restart (Strategy Computation Restart) | Strategy Customization Module 216 | Strategy Computation Module 212 | This message triggers re-computation of optimal strategy by Strategy Computation Module |
| S-C-Redone (Strategy Computation Redone) | Strategy Computation Module 212 | Strategy Customization Module 216 | This message is emitted after completion of optimal strategy re-computation. |
| S-S-Restart (Strategy Synthesis Restart) | Strategy Customization Module 216 | Strategy Synthesis Module 214 | This message triggers update of synthesis of a customized strategy. |
| S-S-Redone (Strategy Synthesis Redone) | Strategy Synthesis Module 214 | Strategy Customization Module 216 | This message is emitted after completion of synthesis update. |

In Initialization Phase, the strategy planning system 102 performs the following initialization activities:
1. Using Messaging service, register as consumer to Strategy-Start messages queue, created by Opportunity Driven System.
2. Using Messaging service, register as producer to Action-Start messages queue created by Opportunity Driven System.
3. Queues to interact with human interaction
4. Using messaging service, create S-O-Start, S-O-Done, S-S-Start, and S-S-Done message queues.
5. Register as producer to S-O-Start and S-S-Start message queues
6. Register as consumer to S-O-Done and S-S-Done message queue
7. For each OT-KO (opportunity type knowledge object) in OTS-KO (Opportunity types knowledge object; perform the following:
   a. get the list of strategy types specifications
   b. for each entry in list obtained in step (a),
      i. Create a new Strategy Type Knowledge Object (ST-KO)
      ii. Initialize ST-KO with the strategy type specification
/*Start Internal Component Modules*/
1. Start the strategy computation module 212, passing it the reference to OTS-KO, the Opportunity Types Knowledge Object.

2. Start the strategy synthesis module 214, passing it the reference to OTS-KO, the Opportunity Types Knowledge Object.

In the execution phase, the strategy planning system 102 executes the following activities concurrently:
1. Upon receiving an S-O-Done (strategy optimization done) message from the strategy computation module 212, perform the following:
   a. Create a new S-S-Start message and include reference to Opportunity Instance Knowledge Object (OI-KO) received in S-O-Done message.
   b. Using messaging service, append the message to S-S-start messages queue.
2. Upon receiving an S-S-Done (strategy synthesis done) message from the strategy synthesis module 214,
   a. Create a new Action-Start message and include a reference to Opportunity Instance Knowledge Object (OI-KO) received in S-S-Done message.

/*Listen to exception/error messages from the strategy computation module 212, the strategy synthesis module 214, and the strategy customization module 216*/
1. Upon receiving an exception message from the strategy computation module 212, the strategy synthesis module 214, or the strategy customization module 216, perform the following:
   a. If exception can be handled at the strategy planning system 102, invoke exception handling mechanism of the strategy planning system 102. This may involve stopping and restarting the strategy computation module 212, the strategy synthesis module 214, or the strategy customization module 216. Save error and recovery logs using logging service.

/*Listen to administrative requests*/
1. Administrative user can interact with Strategy Planning Module (105) to:
   a. View the status of Strategy Planning progress
   b. View errors and logs
   c. Stop and restart the strategy computation module 212
   d. Stop and restart strategy synthesis module 214
   e. Stop and restart strategy customization module 216

In Termination Phase, the strategy planning system 102 continues to be active after initialization until, the strategy planning system 102 halts or there is some fault in the system which brings it down. In the latter case, the systems fault-recovery mechanism kicks in to restart the strategy planning system 102.

In other words, the strategy synthesis module 214 is responsible for assembling detailed information about the strategy arrived at from the strategy computation module 212. When the strategy synthesis module 214 receives a Strategy Synthesis Start (S-S-Start) message, the strategy synthesis module 214 performs synthesis activity resulting in a new Strategy Instance Knowledge Object (SX-KO), populated with the following information: Narrative description of the optimal strategy in natural language (S-Narrative), a Visual description of the Strategy in an interactive graphics (or video) (S-Visual), an evidence, the reasoning behind how the strategy was determined (S-Explanation), a Metrics quantifying the outcome, if the strategy is implemented on time (S-Outcome), and a Measure of Confidence in the Strategy (likelihood of Strategy leading to the predicted outcome) (S-O-Confidence).

In one aspect, requisite knowledge (declarative and procedural) to generate this information is available in two modules i.e. an explanation synthesis specification and an outcome synthesis specification. The explanation synthesis specification contains knowledge needed to derive S-Narrative, S-Visual, and S-Explanation whereas the outcome synthesis specification contains knowledge needed to derive S-Outcome, and S-O-Confidence.

In one embodiment, when a Strategy Types Knowledge Object (OT-KO) is instantiated in memory by reading strategy types specification from a knowledge system (coupled with the strategy planning system 102) in the strategy planning system 102, all the component specifications are instantiated at the same time or later in other modules when needed for the first time. For example, the strategy synthesis module 214 gets the explanation synthesis specification and the outcome synthesis specifications from the knowledge system, if those were not already in OT-KO.

In one embodiment, the strategy synthesis module 214 synthesizes the strategy instance knowledge object by invoking two other modules i.e. an explanation synthesis module 402 and an outcome synthesis module 404 as illustrated in FIG. 4. The strategy synthesis module 214 instantiates the explanation synthesis module 402 and the outcome synthesis module 404 for each opportunity type, during its initialization phase In one aspect, Table 2 below shows top level message types used by the strategy synthesis module 214.

| Message Types used by the strategy synthesis module 214 | | | |
|---|---|---|---|
| Message Type | Producer Module | Consumer Module | Description |
| S-S-Start (Strategy Synthesis Start) | Strategy Planning System 102 | Strategy Synthesis Module 214 | This message triggers synthesis of the optimal strategy arrived at by Strategy Optimization Module. |
| S-EX-Start (Strategy Explanation Synthesis Start) | Strategy Synthesis Module 214 | Explanation Synthesis Module 402 | This message triggers synthesis of explanation for the optimal strategy. |
| S-EX-Done (Strategy Explanation Synthesis Done) | Explanation Synthesis Module 402 | Strategy Synthesis Module 214 | This message is emitted after completion of strategy explanation synthesis. |
| S-OS-Start (Strategy Outcome Synthesis Start) | Strategy Synthesis Module 214 | Outcome Synthesis Module 404 | This message triggers synthesis of outcome of the optimal strategy. |
| S-OS-Done (Strategy Outcome Synthesis Done) | Outcome Synthesis Module 404 | Strategy Synthesis Module 214 | This message is emitted after completion of synthesis of strategy outcome. |
| S-S-Done | Strategy Synthesis Module 214 | Strategy Planning System 102 | This message is emitted after receiving S-OS-Done message for the optimal strategy. |

Figure 5:
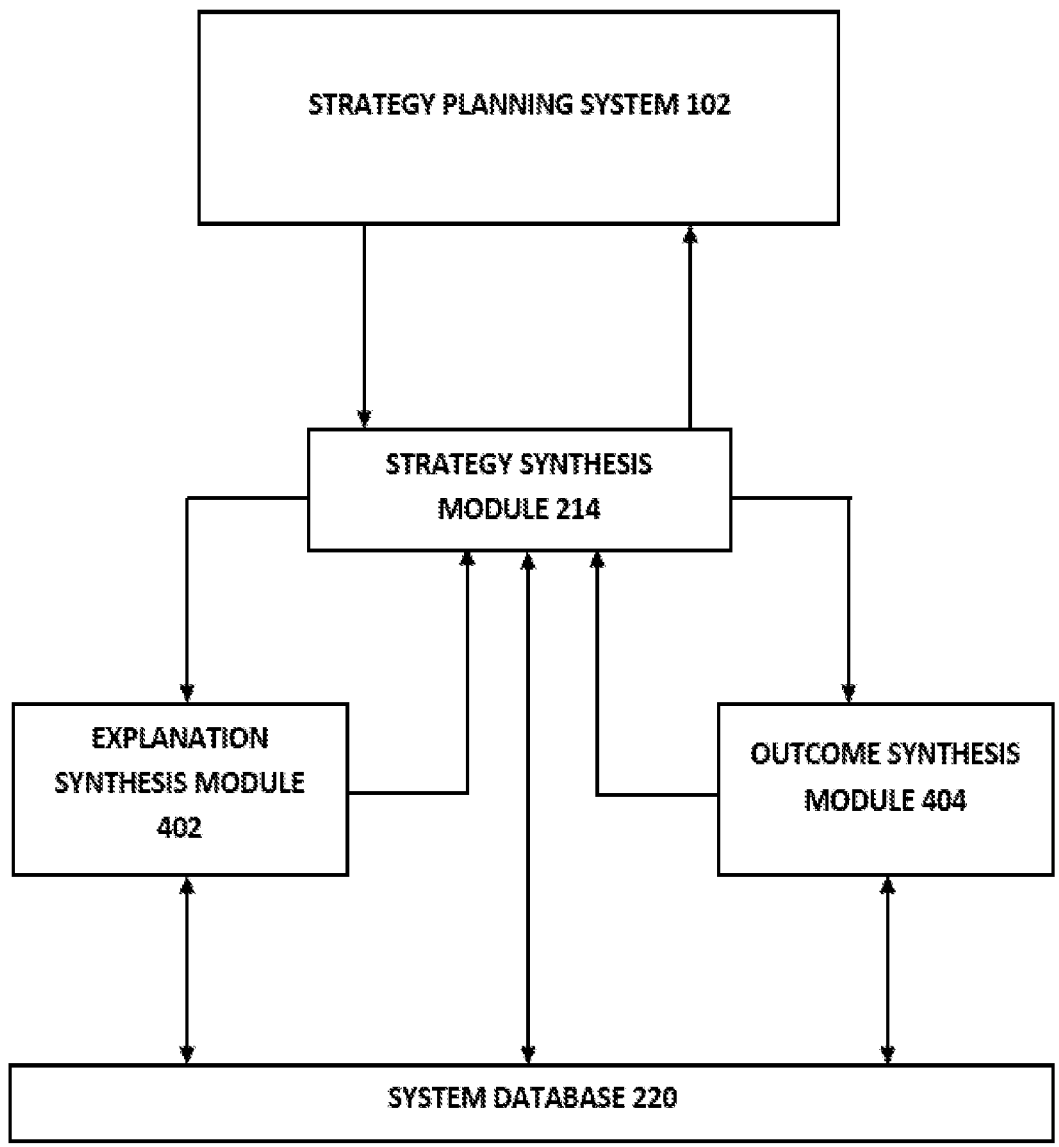
FIG. 5 illustrates the top level flow of messages in the strategy synthesis module, in accordance with an embodiment of the present disclosure.

Referring to FIG. 5 shows the top level flow of messages in the strategy synthesis module 214, using the message types listed in table 1. The detailed description of the flow of messages illustrated in the FIG. 5 is described below.

In Initialization Phase, the strategy synthesis module 214 performs the following initialization activities:
1. Using Messaging service, register as consumer to S-S-Start messages queue, created by the strategy planning system 102.
2. Using Messaging service, register as producer to S-S-Done messages queue created by strategy planning system 102.
3. For entries in Opportunity Types Knowledge Object (OTS-KO):

c. Get the next entry (Opportunity Type Knowledge Object), say OT-KO
d. Using messaging service, create S-ES-Start, S-ES-Done, S-OS-Start, and S-OS-Done message queues for opportunity type OT-KO.
e. Register as producer to S-ES-Start and S-OS-Start message queues.
f. Register as consumer to S-ES-Done and S-OS-Done message queues.

4. For entries in Opportunity Types Knowledge Object (OTS-KO):
  a. Get the next entry (Opportunity Type Knowledge Object), say OT-KO
  b. Start an instance of the explanation synthesis module 402 passing it the reference to OT-KO
  c. Start an instance of the outcome synthesis module 404 passing it the reference to OT-KO In Execution Phase, after completing initialization activities, the strategy synthesis module 214 executes the following concurrent activities:

1. Upon receiving the next S-S-Start message, execute the following steps
  a. Get the reference to Opportunity Type Knowledge Object (OT-KO) from the O-S-Start message.
  b. Create a new Strategy Instance Knowledge Object (SX-KO) of Opportunity Type using the specification in Opportunity Type Knowledge Object in step (a). Insert a reference to Opportunity Detection Knowledge Object (OD-KO) available from the O-S-Start message. Link SX-KO with OX-KO.
  c. Create a new Strategy Explanation Synthesis Start (S-ES-Start) message and insert a reference to Opportunity Instance Knowledge Object (OX-KO) created in step (b). Append the S-ES-Start message to the S-ES-Start message queue for the Opportunity Type in question.
  d. Create a new Strategy Outcome Synthesis Start (S-OS-Start) message and insert a reference to Opportunity Instance Knowledge Object (OX-KO) created in step (b). Append the S-OS-Start message to the S-OS-Start message queue for the Opportunity Type in question.

2. Upon receiving an S-ES-Done from the strategy synthesis module 214, execute the following steps
  a. Get reference to the Opportunity Instance Knowledge Object (OX-KO) from the E-S-Done message.
  b. If Outcome synthesis has already been inserted into OX-KO, then create a new O-S-Done message; insert reference to OX-KO in this message, and append it to the O-S-Done message queue.
  c. Upon receiving an I-S-Done message from an Impact Synthesis Module, execute the following steps:
  d. Get reference to the Opportunity Instance Knowledge Object (OX-KO) from the I-S-Done message.
  e. If evidence synthesis has already been inserted into OX-KO, then create a new O-S-Done message; insert reference to OX-KO in this message, and append it to the O-S-Done message queue.

3. Upon receiving an exception message from the explanation synthesis module 402 or the outcome synthesis module 404, perform the following:
  a. If exception can be handled at the strategy synthesis module 214, invoke exception handling mechanism of the strategy synthesis module 214. This may involve stopping and restarting the explanation synthesis module 402 and/or the outcome synthesis module 404; otherwise forward an exception message to the strategy planning system 102.
  b. Save error and recovery logs using logging service.

/*Listen to administrative requests*/
1. Administrative user can interact with Strategy Synthesis Module (1052) to:
  a. View the status of Strategy Synthesis Progress
  b. View errors and logs
  c. Stop and restart explanation the synthesis module 402 and the outcome synthesis module 404.

In the termination phase, the strategy synthesis module 214 continues to be active after initialization until, the strategy planning system 102 halts or there is some fault in the system which brings it down. In the latter case, the systems fault-recovery mechanism kicks in to restart strategy planning system 102.

In one embodiment, the explanation synthesis module 214 maintains a pool of the explanation synthesis module 402 instances, at least one for each opportunity type. The explanation synthesis module 402 instance works on one opportunity instance at a time. It creates the following objects and inserts their references in the received Strategy Instance Knowledge Object (SX-KO): S-Narrative, S-Visual, and S-Explanation.

In one aspect, several explanation synthesis modules may be running concurrently in the strategy planning system 102. Each such module is associated with an opportunity type. In a simple embodiment, there is one explanation synthesis module for each opportunity type. In alternate embodiments, several explanation synthesis modules may be associated with the same opportunity type. Also, one explanation synthesis modules can also be associated with multiple opportunity types.

In one embodiment, the explanation synthesis module 402 accepts S-ES-Start (Strategy Explanation Synthesis Start) message with a reference to the Opportunity Instance Knowledge Object and after completion of its execution, the explanation synthesis module 402 emits S-ES-Done (Strategy Explanation Synthesis Done) message. The different phases of operation, as illustrated in FIG. 5, pertaining to the explanation synthesis module 402 are defined below:

In Initialization Phase, the explanation synthesis module 402 performs the following initialization activities:
1. Let OT is the opportunity type associated with this instance (available from the parameter opportunity type knowledge object, OT-KO, passed with the start request.)
2. Using Messaging service, register as consumer to S-ES-Start messages queue for opportunity type OT, created by the strategy synthesis module 214.
3. Using Messaging service, register as producer to S-ES-Done messages queue for opportunity type OT, created by the strategy synthesis module 214.
4. From the associated Opportunity Type Knowledge Object, OT-KO, get the following information:
  i. Specification to build S-Narrative
  ii. Specification to build S-Visual
  iii. Specification to build S-Explanation
5. Using the specifications obtained in step 4, configure explanation synthesis code.

In the Execution Phase, after initialization, the explanation synthesis module 402 runs in a loop executing the following steps:
1. Upon receiving an E-S-Start message, perform the following:
  a. Get reference to Strategy Instance Knowledge Object (SX-KO)

b. Build S-Narrative and insert in SX-KO
c. Build S-Visual and insert in SX-KO
d. Build S-Explanation and insert in SX-KO
e. Create a new S-ES-Done (Strategy Explanation Synthesis Done) message
f. Insert a reference to OX-KO in the message created in step (f).
g. Append the message to S-ES-Done messages queue of the opportunity type of OX-KO
2. Using Logging Service, create a Strategy Explanation synthesis log record.

In Termination Phase, the explanation synthesis module 402 may be started/restarted at the beginning of each iteration of the detection loop and terminated at the end of the iteration. Alternately, these modules can be kept running waiting for the next iteration after processing opportunity input package for the current iteration. If the explanation synthesis module 402 halts because of failure, the systems fault-recovery mechanism kicks in to restart the explanation synthesis module 402.

In addition to the above, the strategy synthesis module 214 further maintains a pool of the outcome synthesis module 404 instances, at least one for each opportunity type. The outcome synthesis module 404 instance works on one opportunity instance at a time. It creates the following objects and inserts their references in the received Strategy Instance Knowledge Object (SX-KO): S-Outcome and S-O-Confidence.

In one embodiment, several outcome synthesis modules are running concurrently in the strategy planning system 102. Each such module is associated with an opportunity type. In a simple embodiment, there is one outcome synthesis module for each opportunity type. In alternate embodiments, several outcome synthesis modules can be associated with the same opportunity type. Also, one outcome synthesis modules can also be associated with multiple opportunity types.

The outcome synthesis module 404 accepts S-OS-Start (Strategy Outcome Synthesis Start) message with a reference to Opportunity Instance Knowledge Object and after completion of its execution, it emits S-OS-Done (Strategy Outcome Synthesis Done) message. The different phases of operation, as illustrated in FIG. 5, pertaining to the outcome synthesis module 404 are defined below:

In Initialization Phase, this module performs the following initialization activities:
1. Let OT is the opportunity type associated with this instance (available from the parameter opportunity type knowledge object, OT-KO, passed with the start request.)
2. Using Messaging service, register as consumer to S-OS-Start messages queue for opportunity type OT, created by the strategy synthesis module 214.
3. Using Messaging service, register as producer to S-OS-Done messages queue for opportunity type OT, created by the strategy synthesis module 214.
4. From the associated Opportunity Type Knowledge Object, OT-KO, get the following information:
   i. Specification to build S-Outcome
   ii. Specification to build S-O-Confidence
5. Using the specifications obtained in step 4, configure strategy synthesis code In Execution Phase, after initialization, the outcome synthesis module 404 runs in a loop executing the following steps:
1. Upon receiving an S-OS-Start message, perform the following:
   a. Get reference to Strategy Instance Knowledge Object (SX-KO)
   b. Build S-Outcome and insert in SX-KO
   c. Build S-O-Confidence and insert in SX-KO
   d. Create a new S-OS-Done (Strategy Outcome Synthesis Done) message
   e. Insert a reference to SX-KO in the message created in step e.
   f. Append the message to S-OS-Done messages queue of the opportunity type of OX-KO
2. Using Logging Service, create an outcome synthesis log record.

In Termination Phase, the outcome synthesis module 404 may be started/restarted at the beginning of each iteration of the strategy synthesis loop and terminated at the end of the iteration. Alternately, the outcome synthesis module 404 may be kept running waiting for the next iteration after processing opportunity input package for the current iteration. If the impact synthesis module halts because of failure, the systems fault-recovery mechanism kicks in to restart the outcome synthesis module 404.

In addition to the strategy computation module 212 and the strategy synthesis module 214, the strategy planning system 102 further comprises the strategy customization module 216. The strategy customization module 216 may be responsible for interactions with a decision-maker via a human interaction module for the purpose of what-if-analysis on the strategy determined by the strategy computation module 212. The decision maker using an interactive visual tool presented by the human interaction module may be provided by the means to vary the values of few selected decision variables. As the values of these decision variables are changed, the optimal strategy may be recomputed as well as the strategy synthesis is modified accordingly. This process may repeat several times result into a number of different strategies. The decision maker compares these alternate strategies and eventually approves the final strategy to be implemented.

Figure 6:
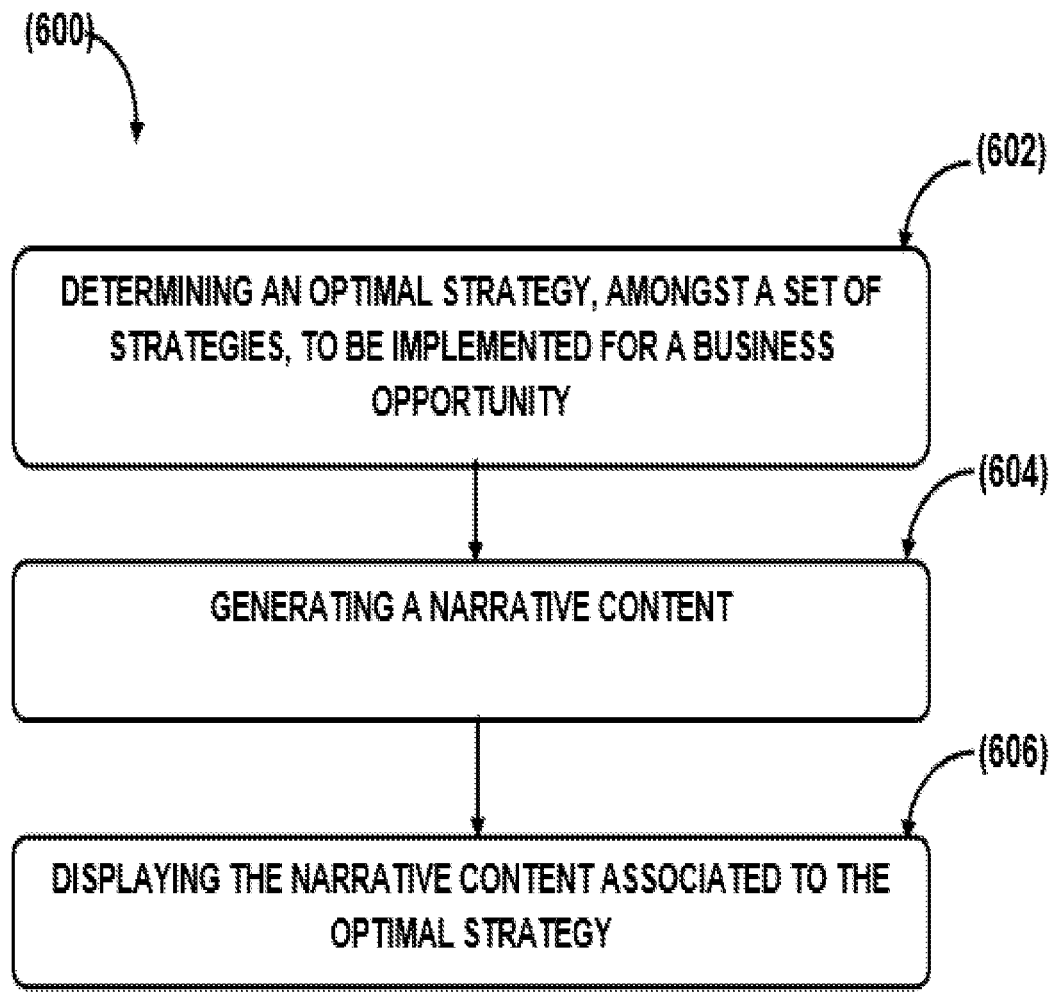
FIG. 6 illustrates a method for displaying a narrative content associated to an optimal strategy to be implemented for a business opportunity.

Referring now to FIG. 6, a method 600 for displaying a narrative content associated to an optimal strategy to be implemented for a business opportunity is shown, in accordance with an embodiment of the present subject matter. The method 600 may be described in the general context of computer executable instructions. Generally, computer executable instructions can include routines, programs, objects, components, data structures, procedures, modules, functions, etc., that perform particular functions or implement particular abstract data types. The method 600 may also be practiced in a distributed computing environment where functions are performed by remote processing devices that are linked through a communications network. In a distributed computing environment, computer executable instructions may be located in both local and remote computer storage media, including memory storage devices.

The order in which the method 600 is described is not intended to be construed as a limitation, and any number of the described method blocks can be combined in any order to implement the method 600 or alternate methods. Additionally, individual blocks may be deleted from the method 600 without departing from the spirit and scope of the subject matter described herein. Furthermore, the method can be implemented in any suitable hardware, software, firmware, or combination thereof. However, for ease of explanation, in the embodiments described below, the method 600 may be considered to be implemented as described in the strategy planning system 102.

At block 602, an optimal strategy, amongst a set of strategies, to be implemented may be determined for a business opportunity. In one aspect, the optimal strategy may be determined upon performing an impact analysis for the optimal strategy. In one implementation, the set of strategies may be stored by the strategy computation module 212.

At block 604, a narrative content may be generated for the optimal strategy. In one implementation, the narrative content may be generated by the strategy synthesis module 214.

At block 606, the narrative content for the optimal strategy pertaining to the business opportunity may be displayed. In one aspect, the narrative content may be displayed by the strategy synthesis module 214.

Figure 7:
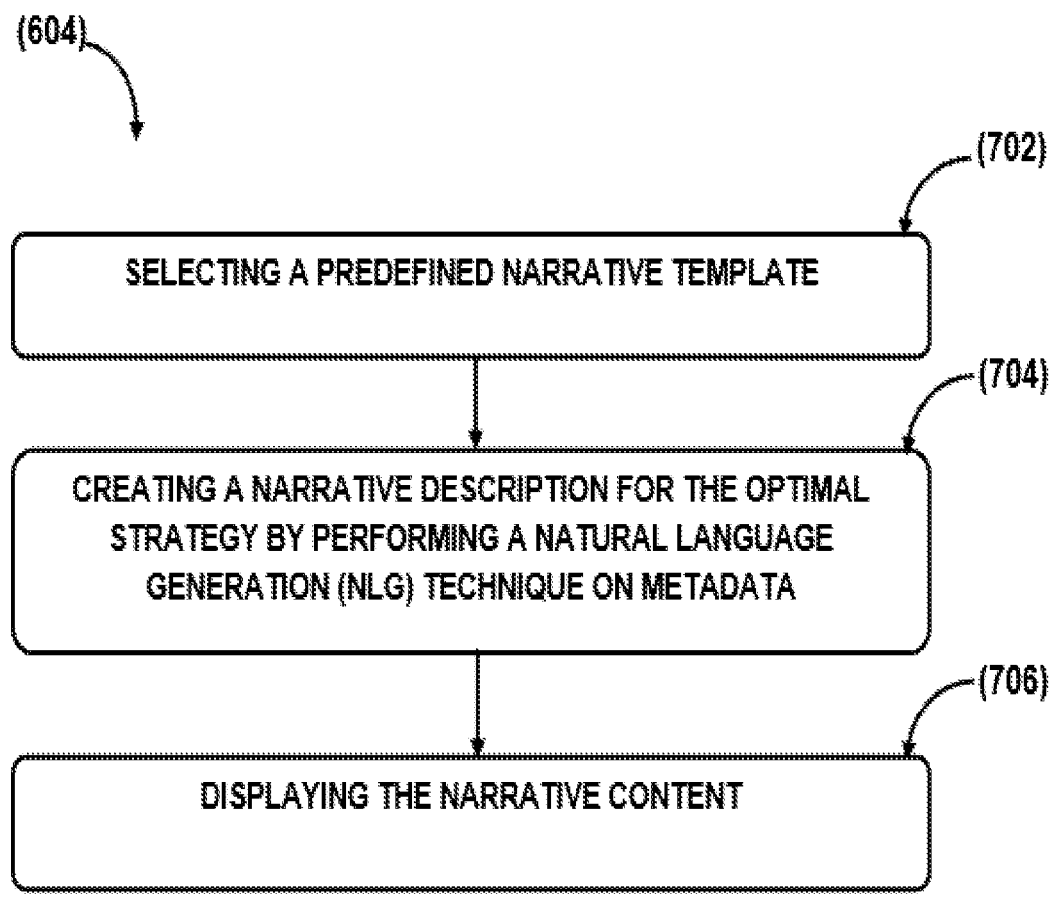
FIG. 7 illustrates a method for generating the narrative content for the optimal strategy.

Referring now to FIG. 7, a method 604 for generating the narrative content for the optimal strategy is shown, in accordance with an embodiment of the present subject matter. The method 700 may be described in the general context of computer executable instructions. Generally, computer executable instructions can include routines, programs, objects, components, data structures, procedures, modules, functions, etc., that perform particular functions or implement particular abstract data types. The method 700 may also be practiced in a distributed computing environment where functions are performed by remote processing devices that are linked through a communications network. In a distributed computing environment, computer executable instructions may be located in both local and remote computer storage media, including memory storage devices.

At block 702, a predefined narrative template, comprising a predefined content, associated to the optimal strategy may be selected. In one aspect, the predefined narrative template may be selected based on a type of the optimal strategy. In one implementation, the predefined narrative template may be selected by the strategy synthesis module 214.

At block 704, a narrative description for the optimal strategy may be created by performing a Natural Language Generation (NLG) technique on metadata associated to the impact analysis. In one implementation, the narrative description for the optimal strategy may be created by the strategy synthesis module 214.

At block 706, the narrative description may be appended to the predefined content in order to generate the narrative content for the optimal strategy. In one implementation, the narrative description may be appended by the strategy synthesis module 214.

Thus, in this manner, the strategy planning system 102 plans the strategy pertaining to the business opportunity process. Although implementations of a method and system for planning the strategy pertaining to the business opportunity process have been described in language specific to structural features and/or methods, it is to be understood that the implementations and/or embodiments are not necessarily limited to the specific features or methods described.

The invention claimed is:

1. A method for displaying a narrative content associated to an optimal strategy to be implemented for an opportunity, the method comprising:
    predicting, by a processor, an impact of a strategy, of a set of strategies, wherein the impact is predicted by analyzing metadata associated to the strategy and an opportunity, and wherein the impact for the set of strategies is predicted in a Distributed Computing Environment (DCE) involving variety of computing systems operating in parallel;
    determining, by the processor, an optimal strategy, amongst the set of strategies, to be implemented for the opportunity, wherein the optimal strategy is determined upon performing an impact analysis on the set of strategies, and wherein the optimal strategy is a combination of one or more strategies to be implemented for the opportunity;
    generating, by the processor, a narrative content for the optimal strategy by,
        selecting a predefined narrative template, comprising a predefined content, associated to the optimal strategy, wherein the predefined narrative template is selected based on a type of the optimal strategy,
        creating a narrative description for the optimal strategy in real time by performing a Natural Language Generation (NLG) technique on the metadata associated to the impact analysis, and
        appending the narrative description to the predefined content in order to generate the narrative content for the optimal strategy; and
    displaying, by the processor, the narrative content associated to the optimal strategy to be implemented for the opportunity.

2. The method of claim 1, wherein the impact analysis is performed to predict an impact, indicating a profit to be attained, when the optimal strategy is implemented for the opportunity.

3. The method of claim 1, wherein the optimal strategy is further determined based on a set of Key Performance Indicators (KPIs) associated to the opportunity, and wherein the set of KPIs captures business policy compliance, brand value, and profitability concerns.

4. The method of claim 1, wherein the NLG technique is performed based on Content determination, Document structuring, Aggregation, Choice of words, and Realization.

5. The method of claim 1, wherein the narrative content further comprises a visual description of the optimal strategy, and wherein the visual description is identified from a system database based on the metadata.

6. The method of claim 1 further comprises generating an outcome metrics indicating a profit attained when the optimal strategy is implemented.

7. A strategy planning system for displaying a narrative content associated to an optimal strategy to be implemented for an opportunity, the strategy planning system comprising:
    a processor; and
    a memory coupled to the processor, wherein the processor is capable of executing programmed instructions stored in the memory for:
    predicting an impact of a strategy, of a set of strategies, wherein the impact is predicted by analyzing metadata associated to the strategy and an opportunity, and wherein the impact for the set of strategies is predicted in a Distributed Computing Environment (DCE) involving variety of computing systems operating in parallel;
    determining an optimal strategy, amongst the set of strategies, to be implemented for the opportunity, wherein the optimal strategy is determined upon performing an impact analysis on the set of strategies, and wherein the optimal strategy is a combination of one or more strategies to be implemented for the opportunity;
    generating a narrative content for the optimal strategy by,
        selecting a predefined narrative template, comprising a predefined content, associated to the optimal strategy, wherein the predefined narrative template is selected based on a type of the optimal strategy,
        creating a narrative description for the optimal strategy in real time by performing a Natural Language Generation (NLG) technique on the metadata associated to the impact analysis, and appending the narrative description to the predefined content in order to generate the narrative content for the optimal strategy; and displaying the narrative content for the optimal strategy to be implemented for the opportunity.

8. The strategy planning system of claim 7, wherein the strategy computation module performs impact analysis to predict an impact, indicating a profit to be attained, when the optimal strategy is implemented for the opportunity.

9. The strategy planning system of claim 7, wherein the strategy computation module further determines the optimal strategy based on a set of Key Performance Indicators (KPIs) associated to the opportunity, and wherein the set of KPIs captures business policy compliance, brand value, and profitability concerns.

10. The strategy planning system of claim 7, wherein the NLG technique is performed based on Content determination, Document structuring, Aggregation, Choice of words, and Realization.

11. The strategy planning system of claim 7, wherein the narrative content further comprises a visual description of the optimal strategy, and wherein the visual description is identified from a system database based on the metadata.

12. The strategy planning system of claim 7, wherein the strategy planning system further generates an outcome metrics indicating a profit attained when the optimal strategy is implemented.

13. The strategy planning system of claim 7 further comprises a strategy customization module for facilitating a user to customize one or more parameters associated to the optimal strategy.

14. A non-transitory computer readable medium embodying a program executable in a computing device for displaying a narrative content associated to an optimal strategy to be implemented for an opportunity, the program comprising a program code:

a program code for predicting an impact of a strategy, of a set of strategies, wherein the impact is predicted by analyzing metadata associated to the strategy and an opportunity, and wherein the impact for the set of strategies is predicted in a Distributed Computing Environment (DCE) involving variety of computing systems operating in parallel;

a program code for determining an optimal strategy, amongst the set of strategies, to be implemented for the opportunity, wherein the optimal strategy is determined upon performing an impact analysis on the set of strategies, and wherein the optimal strategy is a combination of one or more strategies to be implemented for the opportunity;

a program code for generating a narrative content for the optimal strategy by, selecting a predefined narrative template, comprising a predefined content, for the optimal strategy, wherein the predefined narrative template is selected based on a type of the optimal strategy, creating a narrative description for the optimal strategy in real time by performing a Natural Language Generation (NLG) technique on the metadata associated to the impact analysis, and appending the narrative description to the predefined content in order to generate the narrative content for the optimal strategy; and a program code for displaying the narrative content associated to the optimal strategy to be implemented for the opportunity.

15. The method of claim 1, further comprises restarting the optimal strategy based on error and recovery logs when an exception message associated to the implementation of the optimal strategy is received.

16. The method of claim 1, further comprises recomputing the optimal strategy and the narrative content when a user changes values of a decision variable related to the optimal strategy.

17. The system of claim 7, further comprises restarting the optimal strategy based on error and recovery logs when an exception message associated to the implementation of the optimal strategy is received.

18. The system of claim 7, further comprises recomputing the optimal strategy and the narrative content when a user changes values of a decision variable related to the optimal strategy.

* * * * *